United States Patent
Deng et al.

(10) Patent No.: US 11,502,317 B2
(45) Date of Patent: Nov. 15, 2022

(54) FUEL CELL

(71) Applicants: Zhongshan Broad-Ocean Motor Co., Ltd., Zhongshan (CN); Broad-Ocean Motor EV Co., Ltd., Beijing (CN)

(72) Inventors: Jia Deng, Zhongshan (CN); Dongdong Wei, Zhongshan (CN); Tairong Zhu, Zhongshan (CN); Yongfu Zhao, Zhongshan (CN)

(73) Assignees: ZHONGSHAN BROAD-OCEAN MOTOR CO., LTD., Zhongshan (CN); BROAD-OCEAN MOTOR EV CO., LTD., Beijing (CN)

( * ) Notice: Subject to any disclaimer, the term of this patent is extended or adjusted under 35 U.S.C. 154(b) by 54 days.

(21) Appl. No.: 17/033,993

(22) Filed: Sep. 28, 2020

(65) Prior Publication Data

US 2021/0013528 A1    Jan. 14, 2021

Related U.S. Application Data

(63) Continuation-in-part of application No. PCT/CN2018/112276, filed on Oct. 27, 2018.

(30) Foreign Application Priority Data

Jun. 21, 2018  (CN) .......................... 201810642067.3
Jun. 21, 2018  (CN) .......................... 201820957521.X

(51) Int. Cl.
  *H01M 8/04302*  (2016.01)
  *H01M 8/0432*  (2016.01)
  (Continued)

(52) U.S. Cl.
  CPC ... *H01M 8/04302* (2016.02); *H01M 8/04358* (2013.01); *H01M 8/04701* (2013.01); *H01M 8/04746* (2013.01); *H01M 2250/20* (2013.01)

(58) Field of Classification Search
  CPC ......... H01M 8/04029; H01M 8/04044; H01M 8/04067; H01M 8/04358; H01M 8/04417;
  (Continued)

(56) References Cited

U.S. PATENT DOCUMENTS

2017/0187053 A1*  6/2017  Hoshi ............... H01M 8/04738
2018/0048003 A1*  2/2018  Ikeda ................. H01M 8/04119

FOREIGN PATENT DOCUMENTS

CN        108054411       *  5/2018
CN        108054411 A        5/2018
(Continued)

OTHER PUBLICATIONS

English translation of CN Publication 108054411, May 2018.*

*Primary Examiner* — Brittany L Raymond
(74) *Attorney, Agent, or Firm* — Matthias Scholl P.C.; Matthias Scholl

(57) ABSTRACT

A fuel cell including an electrochemical reactor; a cooling circuit; a controller; a coolant circuit; a first temperature sensor; and a second temperature sensor. The cooling circuit includes a cooling pipe, a water pump, a radiator, a heater, and a thermostatic three-way valve. The cooling circuit is configured to cool the electrochemical reactor. The controller is configured to control operations of the electrochemical reactor and the cooling circuit. The cooling pipe includes a first water inlet and a first water outlet; and the coolant circuit is disposed between the first water inlet and the first water outlet. The first temperature sensor is disposed at the first water inlet. The second temperature sensor is disposed at the first water outlet. The first temperature sensor and the second temperature sensor are configured to detect and transmit temperature data of a coolant in the cooling pipe to the controller.

6 Claims, 6 Drawing Sheets

(51) Int. Cl.
*H01M 8/04701* (2016.01)
*H01M 8/04746* (2016.01)

(58) Field of Classification Search
CPC ......... H01M 8/04701; H01M 8/04723; H01M 8/04746; H01M 8/04768
See application file for complete search history.

(56) References Cited

FOREIGN PATENT DOCUMENTS

| | | |
|---|---|---|
| CN | 108615916 A | 10/2018 |
| JP | 2007294305 A | 11/2007 |

* cited by examiner

FUEL CELL

CROSS-REFERENCE TO RELAYED APPLICATIONS

This application is a continuation-in-part of International Patent Application No. PCT/CN2018/112276 with an international filing date of Oct. 27, 2018, designating the United States, and further claims foreign priority benefits to Chinese Patent Application No. 201810642067.3 filed on Jun. 21, 2018, and to Chinese Patent Application No. 201820957521.X filed on Jun. 21, 2018. The contents of all of the aforementioned applications, including any intervening amendments thereto, are incorporated herein by reference. Inquiries from the public to applicants or assignees concerning this document or the related applications should be directed to: Matthias Scholl PC., Attn.: Dr. Matthias Scholl Esq., 245 First Street, 18th Floor, Cambridge, Mass. 02142.

BACKGROUND

The disclosure relates to a fuel cell.

Conventionally, a fuel cell includes an electrochemical reactor and a ventilator. The ventilator inputs air to the electrochemical reactor. The electrochemical reaction between hydrogen and oxygen in the air in the electrochemical reactor generates electric energy. In this process, the electrochemical reactor produces by-products including heat and water. The heat is removed by the cooling system, while the water remains in the proton exchange membrane of the fuel cell. After the electrochemical reactor is shut down, the water remaining on the proton exchange membrane tends to freeze, thus destroying the proton exchange membrane.

SUMMARY

The disclosure provides a fuel cell comprising an electrochemical reactor; a cooling circuit; a controller; a coolant circuit; a first temperature sensor; and a second temperature sensor. The cooling circuit comprises a cooling pipe, a water pump, a radiator, a heater, and a thermostatic three-way valve. The cooling circuit is configured to cool the electrochemical reactor; the controller is configured to control operations of the electrochemical reactor and the cooling circuit; the cooling pipe passes through the electrochemical reactor and comprises a first water inlet and a first water outlet; and the coolant circuit is disposed between the first water inlet and the first water outlet; the first temperature sensor is disposed at the first water inlet; the second temperature sensor is disposed at the first water outlet; the first temperature sensor and the second temperature sensor are configured to detect and transmit temperature data of a coolant in the cooling pipe to the controller; and the controller is further configured to control operations of the thermostatic three-way valve, the water pump, and the heater.

In a class of this embodiment, the water pump comprises a second water inlet and a second water outlet; the radiator comprises a third water inlet and a third water outlet; the thermostatic three-way valve comprises a first inlet, a second inlet, and an outlet; the first water outlet is connected to the second water inlet; the second water outlet is connected to the third water inlet; the third water outlet is connected to the first inlet; the second inlet is connected to the second water outlet; the heater comprises a first end connected to the outlet of the thermostatic three-way valve, and a second end connected to the first water inlet.

In a class of this embodiment, the coolant circuit comprises a deionization filter, an expansion tank and a pressure sensor; the deionization filter comprises a first end connected to the expansion tank and a second end connected to the second water inlet; and the pressure sensor is disposed in the cooling circuit to sense a hydraulic pressure of the coolant.

In a class of this embodiment, the pressure sensor is disposed at the first water outlet of the cooling pipe.

In a class of this embodiment, a solenoid valve is disposed between the deionization filter and the first water inlet, and is controlled by the controller.

In a class of this embodiment, the solenoid valve is a two-position two-way normally open solenoid valve.

In a class of this embodiment, the heater is powered by a power battery pack or an AC or DC power supply.

The disclosure also provides a method for controlling the fuel cell, the method comprising:
  receiving, by the controller, a command to start the heater;
  sensing, by the first temperature sensor, a first temperature $T_1$ of the coolant in the first water inlet;
  starting the heater if the first temperature $T_1$ is less than or equal to a preset starting temperature $T_0$ of the heater; and
  closing the heater if the first temperature $T_1$ is greater than the preset starting temperature $T_0$ of the heater, and starting the electrochemical reactor.

In a class of this embodiment, the preset starting temperature $T_0$ of the heater is between 2-10° C.

In a class of this embodiment, after starting the electrochemical reactor, the method further comprises: generating power by the electrochemical reactor in a preset power which is less than a rated power for a preset time after the controller receives the command to close the device; and closing the electrochemical reactor after the preset time is fulfilled.

In a class of this embodiment, the coolant circuit comprises a solenoid valve, an expansion tank and a pressure sensor; the pressure sensor is disposed in the cooling circuit; and starting the heater if the first temperature $T_1$ is less than or equal to a preset starting temperature $T_0$ of the heater comprises: if the first temperature $T_1$ is less than or equal to a preset starting temperature $T_0$ of the heater, staring the heater and closing the solenoid valve; sensing, by the pressure sensor, a hydraulic pressure of the coolant in the cooling circuit; and if the hydraulic pressure of the coolant is greater than a preset hydraulic pressure, opening the solenoid valve; if not, closing the solenoid valve.

In a class of this embodiment, if the first temperature $T_1$ is greater than the preset starting temperature $T_0$ of the heater, closing the heater and opening the solenoid valve are synchronous.

The following advantages are associated with the fuel cell of the disclosure compared with the related art:

1. During the cold start-up of the fuel cell, the heater heats the coolant in the cooling circuit, which increases the coolant temperature, shortens the start-up time, and improves the efficiency of the fuel cell.

2. The thermostatic three-way valve is used to control the flow direction of the coolant in the cooling circuit, so that the coolant does not pass through the radiator, which further improves the working efficiency of the fuel cell.

3. The solenoid valve is disposed between the deionization filter and the first water inlet, and is controlled by the controller. The pressure sensor is disposed in the cooling circuit to sense the hydraulic pressure of the coolant. The controller is configured to control the solenoid valve according to the hydraulic pressure of the coolant to ensure that the hydraulic pressure of the cooling circuit is normal.

4. After receiving the command to close the fuel cell, a power output less than the rated power is set for the electrochemical reactor to increase the gas excess coefficient in the electrochemical reactor. The exhaust system outside the electrochemical reactor blows off the reaction water on membrane of the fuel cell, which reduces the reaction water remaining on the proton exchange membrane of the fuel cell, and effectively protects the proton exchange membrane.

5. When heater is started, the solenoid valve is closed so as to cut off the coolant circuit, allowing the coolant in the cooling circuit to be heated up faster. After the heater works for a certain time, the coolant is heated and expanded. When the pressure sensor detects that the hydraulic value in the cooling circuit is higher than a set value, the solenoid valve is opened, and the coolant of the cooling circuit flows into the coolant circuit, thus releasing the pressure in the cooling circuit.

DETAILED DESCRIPTION

To further illustrate, embodiments detailing a fuel cell are described below. It should be noted that the following embodiments are intended to describe and not to limit the disclosure.

Example 1

Figure 1:
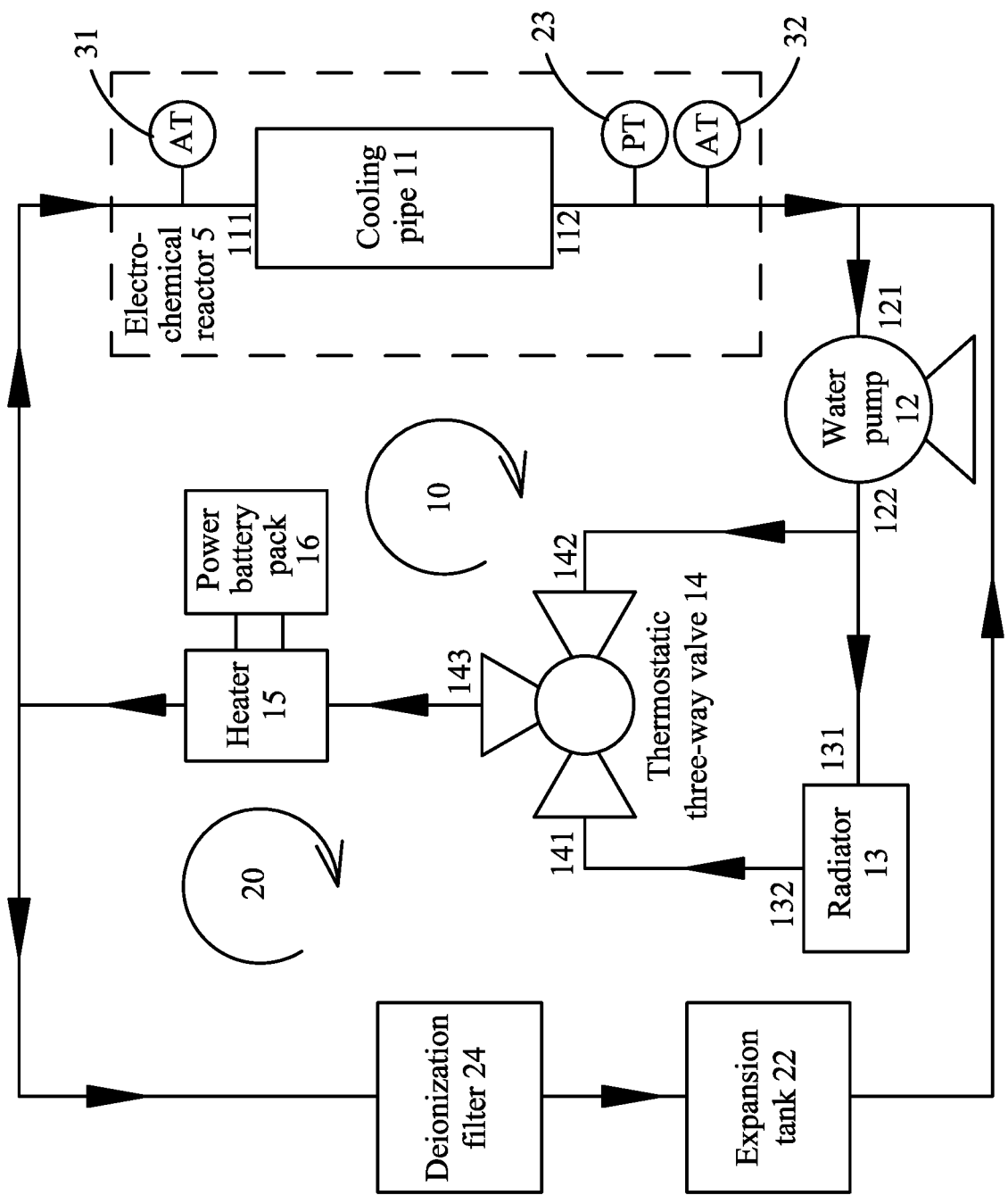
FIG. 1 is a schematic diagram of a fuel cell in accordance with a first embodiment of the disclosure.
Figure 2:
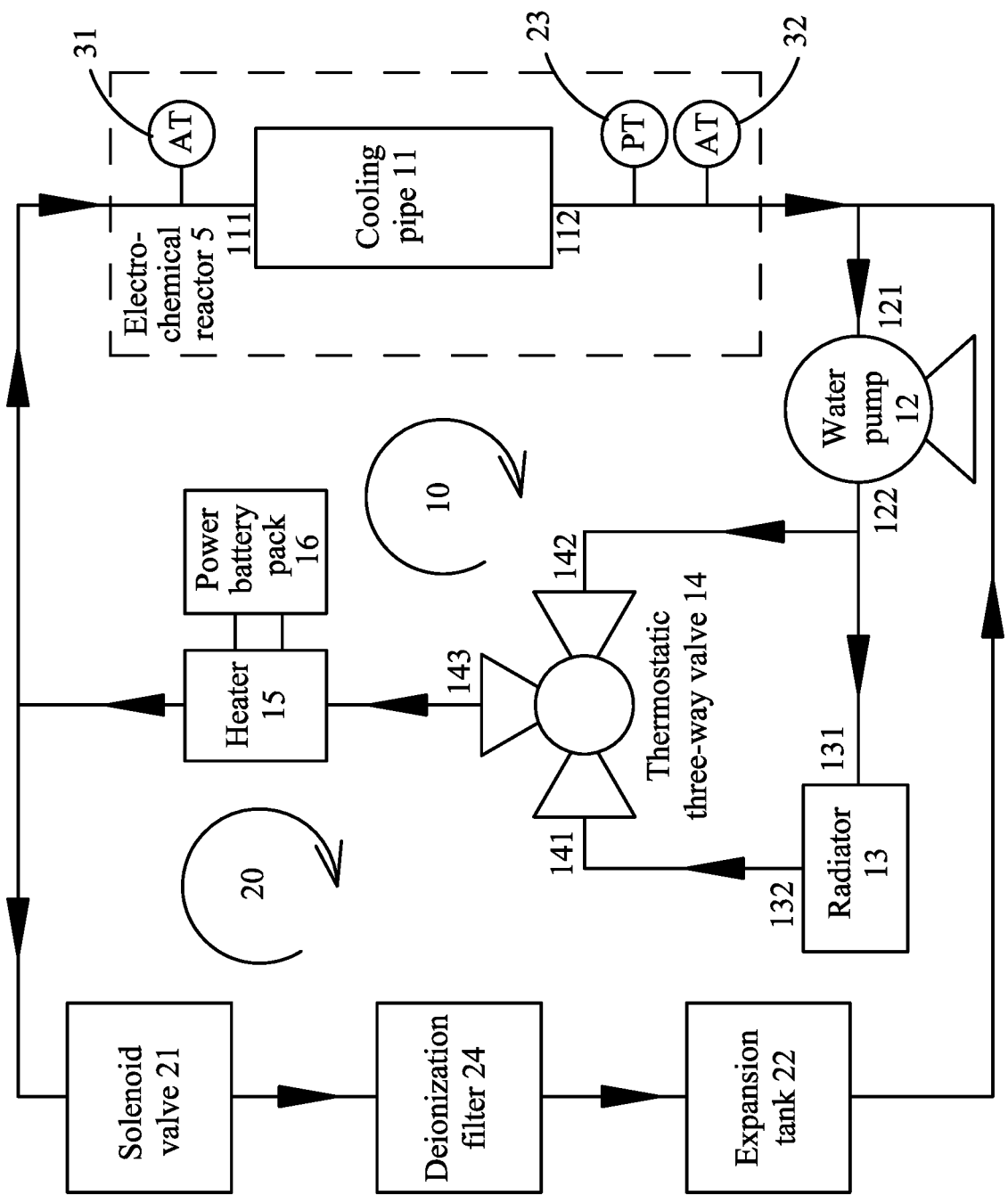
FIG. 2 is a schematic diagram of a fuel cell in accordance with a second embodiment of the disclosure.
Figure 3:
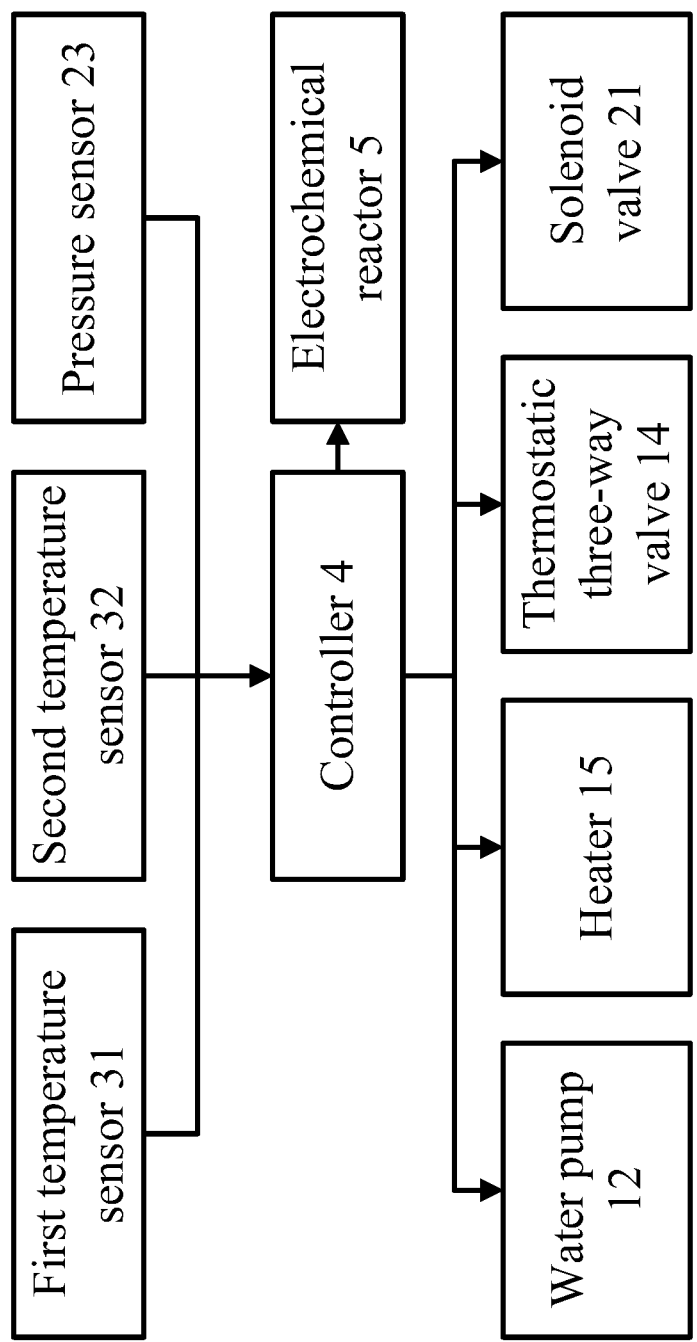
FIG. 3 is a schematic diagram of a fuel cell in accordance with a third embodiment of the disclosure.

As shown in FIGS. 1-3, provided is a fuel cell comprising an electrochemical reactor 5, a cooling circuit 10, a controller 4, a coolant circuit 20, a first temperature sensor 31, and a second temperature sensor 32. The electrochemical reactor 5 makes use of the electrochemical reaction of air and hydrogen to generate power. The cooling circuit 10 is configured to cool the electrochemical reactor 5, and comprises a cooling pipe 11, a water pump 12, a radiator 13, a heater 15 and a thermostatic three-way valve 14. The controller 4 is configured to control the operations of the electrochemical reactor 5 and the cooling circuit 10. The cooling pipe 11 passes through the electrochemical reactor 5 and comprises a first water inlet 111 and a first water outlet 112; and the coolant circuit 20 is disposed between the first water inlet 111 and the first water outlet 112. The first temperature sensor 31 is disposed at the first water inlet 111; the second temperature sensor 32 is disposed at the first water outlet 112; the first temperature sensor 31 and the second temperature sensor 32 are configured to detect and transmit temperature data of a coolant in the cooling pipe 11 to the controller 4; and the controller 4 is further configured to control operations of the thermostatic three-way valve 14, the water pump 12, and the heater 15.

When the fuel cell is started at a low temperature, the heater 15 heats the coolant in the cooling circuit 10, so as to raise the temperature of the coolant, shorten the waiting time of the cold start, and improve the working efficiency of the fuel cell.

The water pump 12 comprises a second water inlet 121 and a second water outlet 122; the radiator 13 comprises a third water inlet 131 and a third water outlet 132; the thermostatic three-way valve 14 comprises a first inlet 141, a second inlet 142, and an outlet 143; the first water outlet 112 is connected to the second water inlet 121; the second water outlet 122 is connected to the third water inlet 131; the third water outlet 132 is connected to the first inlet 141; the second inlet 142 is connected to the second water outlet 122; the heater 15 comprises a first end connected to the outlet 143 of the thermostatic three-way valve 14, and a second end connected to the first water inlet 111.

The working temperature of the thermostatic three-way valve 14 is 55° C. The thermostatic three-way valve 14 is used to control the flow direction of the coolant in the cooling circuit 10. The optimal operating temperature of the fuel cell is between 60° C. and 70° C. When the fuel cell starts to work, the coolant temperature is low and there is no need for heat dissipation. As a result, the coolant directly enters the thermostatic three-way valve 14 from the water pump 12. When the coolant temperature rises to 55° C., the first inlet 141 of the thermostatic three-way valve 14 gradually opens and the second inlet 142 gradually closes, and the coolant flows through the water pump 12, the radiator 13 and the thermostatic three-way valve 14 in order. When the first inlet 141 is fully opened, all the coolant will conduct heat exchange with the outside through the radiator 13. This further improves the working efficiency of the fuel cell.

The coolant circuit 20 comprises a deionization filter 24, an expansion tank 22 and a pressure sensor 23; the deionization filter 24 comprises a first end connected to the expansion tank 22 and a second end connected to the second water inlet 121; and the pressure sensor 23 is disposed in the cooling circuit 10 to sense a hydraulic pressure of the coolant. The expansion tank 22 is disposed at the highest point of the cooling circuit. The coolant circuit 20 automatically balances the hydraulic pressure of the cooling circuit 10 and supplement the coolant, and the deionization filter 24 can filters the ions in the coolant.

The pressure sensor 23 is disposed at the first water outlet 112 of the cooling pipe 11.

The heater 15 is powered by a power battery pack 16 or an AC or DC power supply. The output power of the heater 15 can be set according to the coolant temperature to ensure the heating speed of the coolant.

As shown in FIG. 2, a solenoid valve 21 is disposed between the deionization filter 24 and the first water inlet 111, and is controlled by the controller 4. The pressure sensor 23 is disposed in the cooling circuit 10 to sense the hydraulic pressure of the coolant. The controller 4 is configured to control the solenoid valve 21 according to the hydraulic pressure of the coolant to ensure that the hydraulic pressure of the cooling circuit 10 is normal.

In certain embodiments, the solenoid valve 21 is a two-position two-way normally open solenoid valve.

Example 2

Figure 4:
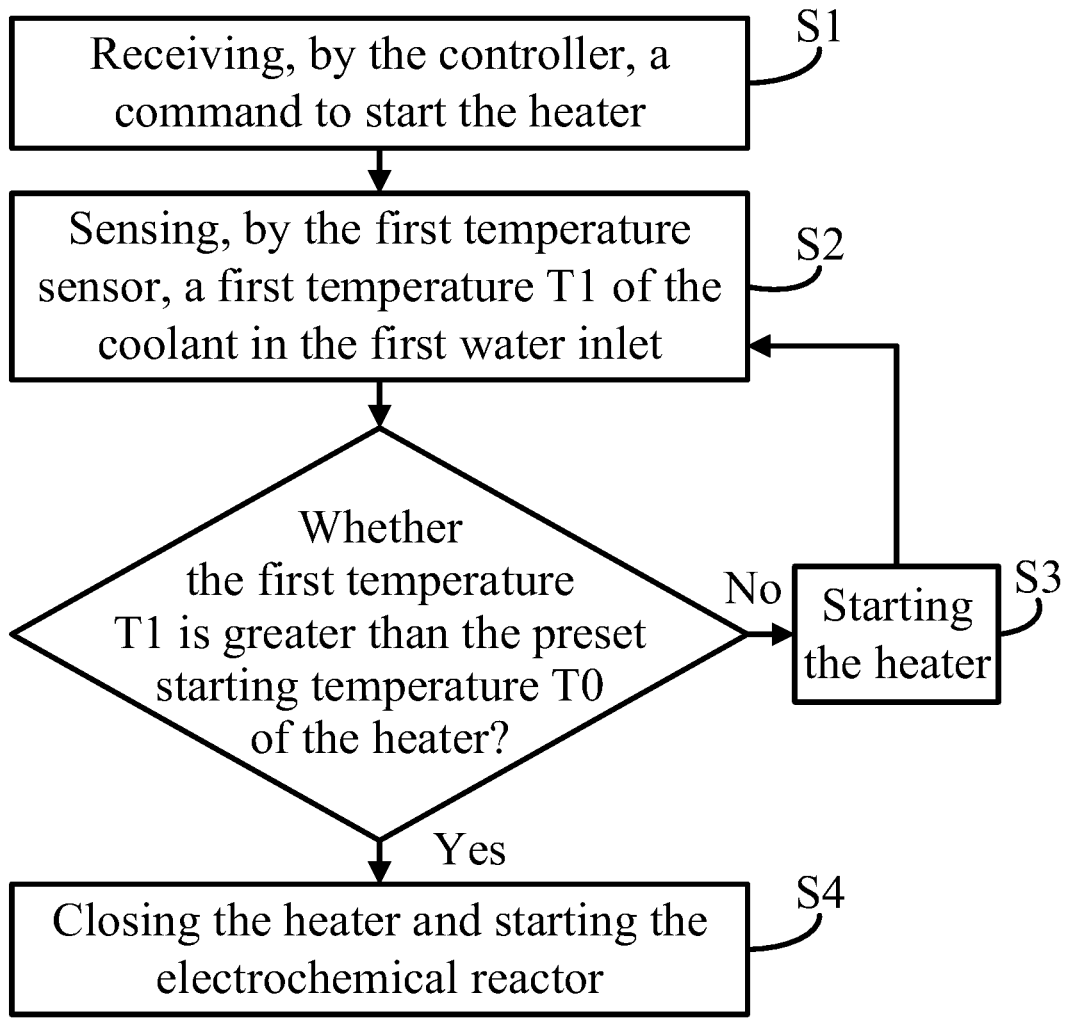
FIG. 4 is a flow chart of a method for controlling a fuel cell in accordance with a first embodiment of the disclosure.

As shown in FIG. 4, provided is a method for controlling the fuel cell in Example 1, the method comprising:

S1: receiving, by the controller 4, a command to start the heater;

S2: sensing, by the first temperature sensor 31, a first temperature T1 of the coolant in the first water inlet 111;

S3: starting the heater 15 if the first temperature T1 is less than or equal to a preset starting temperature T0 of the heater 15; and S4: closing the heater 15 if the first temperature T1 is greater than the preset starting temperature T0 of the heater 15, and starting the electrochemical reactor 5.

The preset starting temperature T0 of the heater 15 is between 2-10° C. When the coolant temperature is less than or equal to the preset starting temperature T0, the temperature of the coolant is close to the freezing point, and the heater 15 begins to heat the coolant, so that the coolant temperature rises rapidly. At the same time, the temperature inside the electrochemical reactor 5 is increased through the heat transfer between the coolant and the electrochemical reactor 5, thus preventing the water remaining on the proton exchange membrane from freezing and protecting the proton exchange membrane. When the coolant is heated and the temperature thereof is higher than the preset starting temperature T0, the heater 15 is closed. This shortens the reaction time of the cold start of the fuel cell. The output power of the heater 15 can be set according to the coolant temperature to ensure the heating speed of the coolant.

Figure 5:
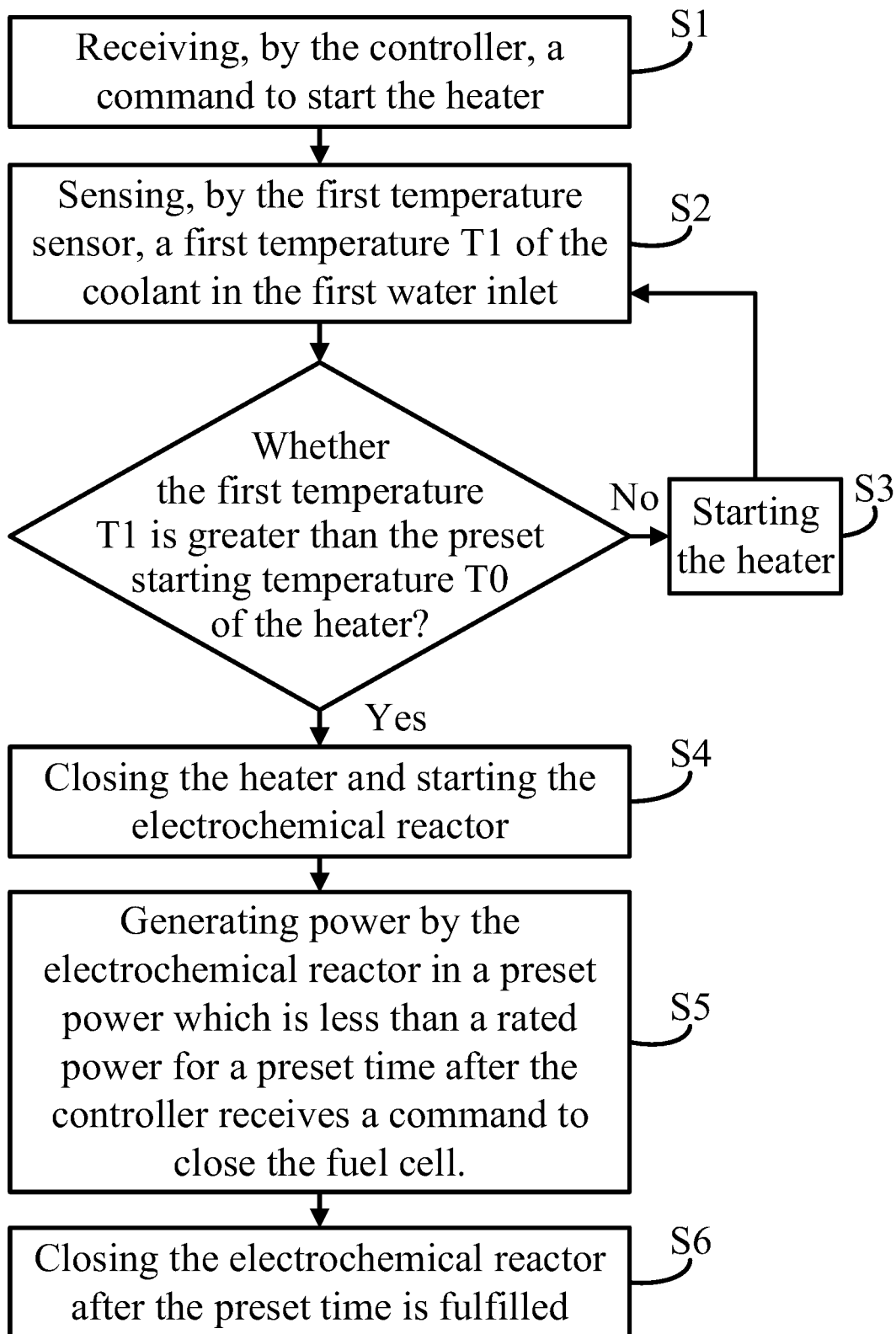
FIG. 5 is a flow chart of a method for controlling a fuel cell in accordance with a second embodiment of the disclosure.

In certain embodiment, as shown in FIG. 5, in S4, after starting the electrochemical reactor and closing the heater 15 if the first temperature T1 is greater than the preset starting temperature T0 of the heater 15, the method further comprises:

S5: generating power by the electrochemical reactor 5 in a preset power which is less than a rated power for a preset time after the controller receives a command to close the fuel cell.

After receiving the command to close the fuel cell, a power output less than the rated power is set for the electrochemical reactor 5 to increase the gas excess coefficient in the electrochemical reactor 5. The exhaust system outside the electrochemical reactor 5 blows off the reaction water on membrane of the fuel cell, which reduces the reaction water remaining on the proton exchange membrane of the fuel cell, and effectively protects the proton exchange membrane.

S6: Closing the electrochemical reactor 5 after the preset time is fulfilled.

Figure 6:
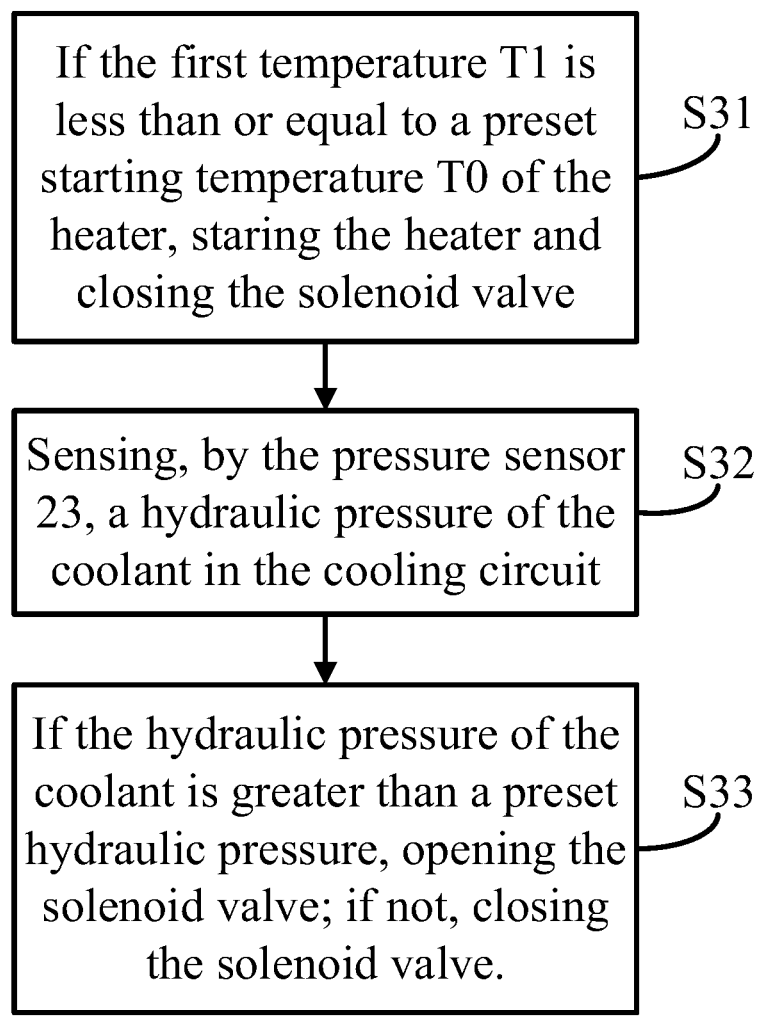
FIG. 6 is a flow chart of staring a heater and closing a solenoid valve of a fuel cell in accordance with one embodiment of the disclosure.

In certain embodiment, as shown in FIG. 6, the coolant circuit 20 comprises a solenoid valve 21, an expansion tank 22 and a pressure sensor 23; in S3, starting the heater 15 if the first temperature T1 is less than or equal to a preset starting temperature T0 of the heater 15 comprises:

S31: if the first temperature T1 is less than or equal to a preset starting temperature T0 of the heater 15, staring the heater and closing the solenoid valve 21;

When the heater 15 is started, the solenoid valve 21 is closed so as to cut off the coolant circuit 20, allowing the coolant in the cooling circuit 10 to be heated up faster;

S32: sensing, by the pressure sensor 23, a hydraulic pressure of the coolant in the cooling circuit 10;

S33: if the hydraulic pressure of the coolant is greater than a preset hydraulic pressure, opening the solenoid valve 21; if not, closing the solenoid valve 21.

After the heater 15 works for a certain time, the coolant is heated and expanded. When the pressure sensor 23 detects that the hydraulic value in the cooling circuit 10 is higher than a set value, the solenoid valve 21 is opened, and the coolant of the cooling circuit 10 flows into the coolant circuit 20, thus releasing the pressure in the cooling circuit 10.

In certain embodiment, in S4, if the first temperature T1 is greater than the preset starting temperature T0 of the heater 15, closing the heater 15 and opening the solenoid valve 21 are synchronous.

It will be obvious to those skilled in the art that changes and modifications may be made, and therefore, the aim in the appended claims is to cover all such changes and modifications.

What is claimed is:

1. A device, comprising:
an electrochemical reactor;
a cooling circuit, the cooling circuit comprising a cooling pipe, a water pump, a radiator, a heater, and a thermostatic three-way valve;
a controller;
a coolant circuit;
a first temperature sensor; and
a second temperature sensor;
wherein:
the cooling circuit is configured to cool the electrochemical reactor;
the controller is configured to control operations of the electrochemical reactor and the cooling circuit;
the cooling pipe passes through the electrochemical reactor and comprises a first water inlet and a first water outlet;
the coolant circuit is disposed outside electrochemical reactor; one end of the coolant circuit is connected to the first water inlet and the other end of the coolant circuit is connected to the first water outlet;
the first temperature sensor is disposed at the first water inlet;
the second temperature sensor is disposed at the first water outlet;
the first temperature sensor and the second temperature sensor are configured to detect and transmit temperature data of a coolant in the cooling pipe to the controller;
the controller is further configured to control operations of the thermostatic three-way valve, the water pump, and the heater;
the water pump comprises a second water inlet and a second water outlet; the radiator comprises a third water inlet and a third water outlet; the thermostatic three-way valve comprises a first inlet, a second inlet, and an outlet; the first water outlet is connected to the second water inlet; the second water outlet is connected to the third water inlet; the third water outlet is connected to the first inlet; the second inlet is connected to the second water outlet; the heater comprises a first end connected to the outlet of the thermostatic three-way valve, and a second end connected to the first water inlet.

2. The device of claim 1, wherein the coolant circuit comprises a deionization filter, an expansion tank and a pressure sensor; the deionization filter comprises a first end connected to the expansion tank and a second end connected to the first water inlet; the expansion tank is connected to the second water inlet and the pressure sensor is disposed in the cooling circuit to sense a hydraulic pressure of a coolant in the cooling circuit.

3. The device of claim 2, wherein the pressure sensor is disposed at the first water outlet of the cooling pipe.

4. The device of claim 3, wherein a solenoid valve is disposed between the deionization filter and the first water inlet, and is controlled by the controller.

5. The device of claim 4, wherein the solenoid valve is a two-position two-way normally open solenoid valve.

6. The device of claim 1, wherein the heater is powered by a power battery pack or an AC or DC power supply.

\* \* \* \* \*